United States Patent
Kim (10) Patent No.: US 11,194,661 B1
(45) Date of Patent: Dec. 7, 2021

(54) MEMORY SYSTEM FOR ACCESSING DATA IN STRIPE FORM AND OPERATING METHOD THEREOF

(71) Applicant: SK hynix Inc., Icheon (KR)

(72) Inventor: Dong Hwan Kim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/069,012

(22) Filed: Oct. 13, 2020

(30) Foreign Application Priority Data

Jun. 9, 2020 (KR) .................. 10-2020-0069602

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0659* (2013.01); *G06F 3/0673* (2013.01)

(58) Field of Classification Search
CPC .................................................. G06F 11/1076
USPC ................. 714/764, 762, 766, 763
See application file for complete search history.

(56) References Cited

U.S. PATENT DOCUMENTS

| 7,873,782 | B2* | 1/2011 | Terry ................. G06F 3/0607 711/114 |
| 2003/0041211 | A1* | 2/2003 | Merkey ............ G06F 11/1076 711/114 |
| 2018/0046549 | A1* | 2/2018 | Steffko ............ G06F 11/1084 |

FOREIGN PATENT DOCUMENTS

| KR | 20160042287 A | 4/2016 |
| KR | 102032878 B1 | 10/2019 |

* cited by examiner

*Primary Examiner* — Fritz Alphonse (57) ABSTRACT

A memory system includes a plurality of memory devices, a buffer memory, and a controller. The controller generates bitmap information for a plurality of pages to distinguish a first page on which a read operation has succeeded from a second page on which the read operation has failed, and stores the bitmap information in the buffer memory, whenever completing the read operation for each of the plurality of pages. The controller generates parity data by cumulatively performing a parity operation on data of the first page whenever performing the read operation on each of the plurality of pages, and stores the parity data in the buffer memory. The controller checks the bitmap information after the read operations on the plurality of pages are completed, and recovers data of the second page by referring to the parity data when the second page is present among the plurality of pages.

18 Claims, 5 Drawing Sheets

MEMORY SYSTEM FOR ACCESSING DATA IN STRIPE FORM AND OPERATING METHOD THEREOF

CROSS-REFERENCE TO RELATED APPLICATION

This application claims priority under 35 U.S.C. § 119 to Korean Patent Application No. 10-2020-0069602 filed on Jun. 9, 2020, which is incorporated herein by reference in its entirety.

BACKGROUND

1. Field

Exemplary embodiments relate to a memory system, and more particularly, to a memory system for accessing data in stripe form and an operating method thereof.

2. Discussion of the Related Art

Recently, a computer environment paradigm has shifted to ubiquitous computing, which enables a computing system to be accessed virtually anytime and everywhere. As a result, the use of portable electronic devices such as mobile phones, digital cameras, notebook computers, and the like has increased. Such portable electronic devices each use or include a memory system, i.e., a data storage device, that uses or embeds at least one memory device. The data storage device can be used as a main storage device or an auxiliary storage device of a portable electronic device.

In a computing system, a data storage device using a nonvolatile semiconductor memory device is advantageous compared to a hard disk. Such a data storage device has excellent stability and durability because it has no mechanical driving part (e.g., a mechanical arm) and has high data access speed and low power consumption. Examples of such a data storage device include a universal serial bus (USB) memory device, a memory card having various interfaces, a solid state drive (SSD), and so on.

SUMMARY

Various embodiments are directed to a memory system, which can more effectively recover data of a page on which a read operation has failed when reading data of a plurality of pages included in stripe data obtained by grouping data pages and parity pages, and an operating method thereof.

In an embodiment, a memory system may include: a plurality of memory devices; a buffer memory; and a controller configured to access stripe data stored in the plurality of memory devices, the stripe data being obtained by grouping data stored in a plurality of pages included in the plurality of memory devices. The controller may be configured to: access the stripe data by reading data stored in each of the plurality of pages on a page basis according to a preset order, generate bitmap information for the plurality of pages to distinguish a first page on which a read operation has succeeded from a second page on which the read operation has failed, and store the bitmap information in the buffer memory, whenever completing the read operation for each of the plurality of pages, generate parity data by cumulatively performing a parity operation on data of the first page among the plurality of pages whenever performing the read operation on each of the plurality of pages, and store the parity data in the buffer memory, and check the bitmap information after the read operations on the plurality of pages are completed, and recover data of the second page by referring to the parity data when the second page is present among the plurality of pages.

The controller may include an error correction code (ECC) unit and may be configured to: read data from a read page corresponding to each of the plurality of pages according to the preset order, check whether an error occurs in the data read from the read page using the ECC unit, and perform an error correction decoding operation on the data read from the read page when the error occurs, determine that the read operation performed on the read page has succeeded when no error occurs or the error correction decoding operation has succeeded, and sort the read page as the first page, and determine that the read operation performed on the read page has failed when the error correction decoding operation has failed, and sort the read page as the second page.

The controller may set a bit of the bitmap information that corresponds to the first page to a first value, and may set a bit of the bitmap information corresponding to the second page to a second value that is different from the first value.

Each of the plurality of memory devices may include a plurality of memory blocks each including a plurality of wordlines, each of the plurality of wordlines being coupled to a plurality of memory cells in a corresponding memory block, each memory cell storing N bits of data. The controller may generate the stripe data by selecting one or more of the plurality of memory devices, selecting one or more memory blocks included in each of the one or more selected memory devices, selecting one or more wordlines included in each of the one or more selected memory blocks, selecting one of N pages coupled to each of the one or more selected wordlines, the N pages respectively corresponding to the N bits of data, and sorting, as the plurality of pages, the selected pages according to the preset order, where N may be a natural number equal to or more than 1.

The controller may generate the parity data by performing an XOR operation as the parity operation.

The plurality of pages may include at least one parity page and a multiplicity of data pages.

When a result of checking the bitmap information after the read operations on the plurality of pages are completed indicates that the second page is present among the plurality of pages and the controller succeeds in recovering the data of the second page by referring to the parity data, the controller may output the data of the first page and the recovered data of the second page as read data to a host.

When a result of checking the bitmap information after the read operations on the plurality of pages are completed indicates that the second page is present among the plurality of pages and the controller fails to recover the data of the second page, the controller may output the data of the first page as read data to a host.

When a result of checking the bitmap information after the read operations on the plurality of pages are completed indicates that no second page is present among the plurality of pages, the controller may output the data of the first page as read data to a host.

In an embodiment, a method of operating a memory system which includes a plurality of memory devices and a buffer memory, the method may include: accessing stripe data by reading data stored in a plurality of pages on a page basis according to a preset order, the stripe data being obtained by grouping the data stored in the plurality of pages included in the plurality of memory devices; generating bitmap information for the plurality of pages to distinguish a first page on which a read operation has succeeded from a second page on which the read operation has failed, and storing the bitmap information in the buffer memory, when the read operation for each of the plurality of pages is completed; generating parity data by cumulatively performing a parity operation on data of the first page among the plurality of pages whenever performing the read operation on each of the plurality of pages, and storing the parity data in the buffer memory, and checking the bitmap information after the read operations on the plurality of pages are completed, and recovering data of the second page by referring to the parity data when the second page is present among the plurality of pages.

Reading the data stored in the plurality of pages may include: reading data from a read page corresponding to each of the plurality of pages according to the preset order, checking whether an error occurs in the data read from the read page, and performing an error correction decoding operation on the data read from the read page when the error occurs; determining that the read operation performed on the read page has succeeded when no error occurs or the error correction decoding operation has succeeded, and sorting the read page as the first page; and determining that the read operation performed on the read page has failed when the error correction operation has failed, and sorting the read page as the second page.

Generating the bitmap generation may include setting a bit of the bitmap information that corresponds to the first page to a first value, and setting a bit of the bitmap information that corresponds to the second page to a second value that is different from the first value.

Each of the memory devices may include a plurality of memory blocks each including a plurality of wordlines, each of the plurality of wordlines being coupled to a plurality of memory cells in a corresponding memory block, each memory cell storing N bits of data. The method may include generating the strip data by selecting one or more of the plurality of memory devices, selecting one or more memory blocks included in each of the one or more selected memory devices, selecting one or more wordlines included in each of the one or more selected memory blocks, selecting one of N pages coupled to each of the one or more selected wordlines, the N pages respectively corresponding to the N bits of data, and sorting, as the plurality of pages, the selected pages according to the preset order, where N may be a natural number equal to or more than 1.

The parity data may be generated by performing an XOR operation as the parity operation.

The plurality of pages may include at least one parity page and a multiplicity of data pages.

When the second page is present among the plurality of pages and the recovering of the data of the second page succeeds, the data of the first page and the recovered data of the second page may be output as read data to a host.

When the second page is present among the plurality of pages and the recovering of the data of the second page fails, the data of the first page may be output as read data to a host.

When the second page is not present among the plurality of pages, the data of the first page may be output as read data to a host.

In accordance with the present embodiments, when reading stripe data obtained by grouping data pages and parity pages, the memory system and the operating method thereof may generate parity information by cumulatively performing a parity operation whenever a read operation on a page basis succeeded, and perform a recovery operation by referring to the parity information when the read operation on a page basis fails.

In accordance with the embodiments, the memory system and the operating method thereof can perform a recovery operation on a page on which a read operation has failed without re-reading data of a page on which the read operation has already succeeded.

DETAILED DESCRIPTION

Various embodiments of the present disclosure are described below in more detail with reference to the accompanying drawings. Aspects and features of the present technology, however, may be embodied in different ways to form other embodiments, including variations of any of the disclosed embodiments. Thus, the disclosed technology is not to be construed as being limited to the embodiments set forth herein. Rather, the described embodiments are provided so that this disclosure is thorough and complete, and fully conveys the disclosure to those skilled in the art to which the technology pertains. Throughout the disclosure, like reference numerals refer to like parts throughout the various figures and examples of the disclosure. It is noted that reference to "an embodiment," "another embodiment," or the like does not necessarily mean only one embodiment, and different references to any such phrase are not necessarily to the same embodiment(s).

It will be understood that, although the terms "first," "second," "third," and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the technology.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the disclosed technology. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the technology belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the technology. The technology may be practiced without some or all of these specific details. In other instances, well-known process structures and/or processes have not been described in detail in order not to unnecessarily obscure the technology.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

Figure 1:
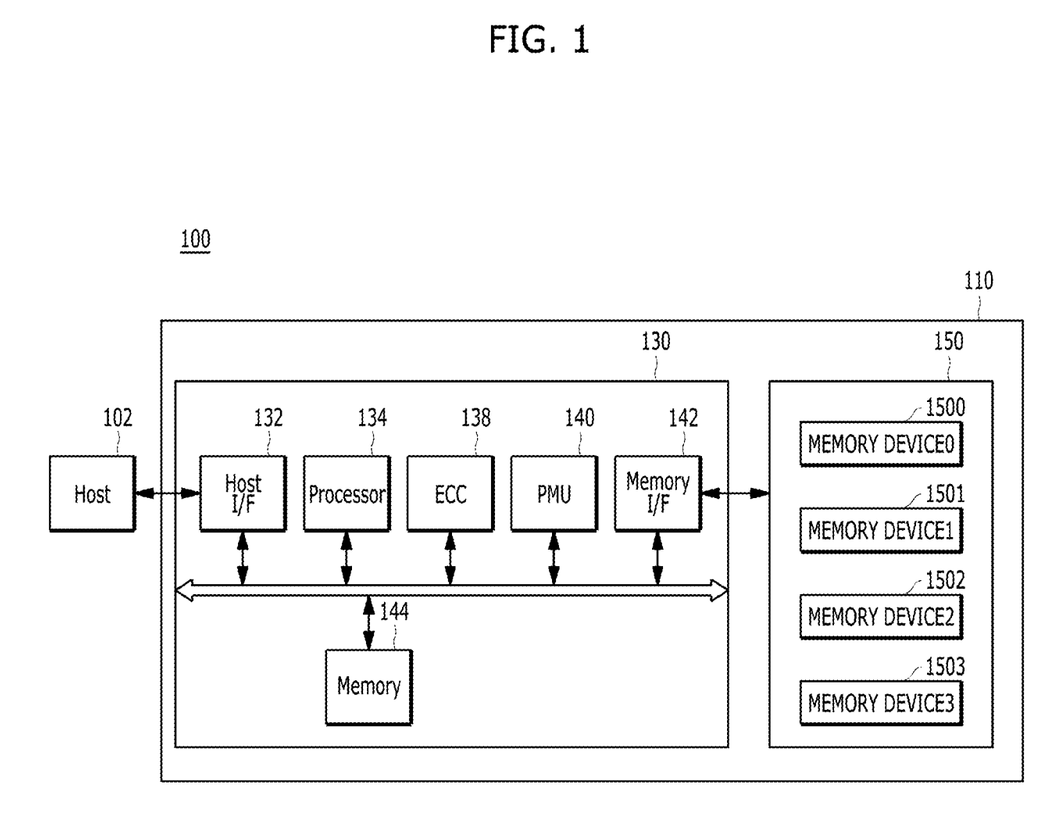
FIG. 1 illustrates a data processing system including a memory system in accordance with an embodiment.

FIG. 1 illustrates a data processing system 100 including a memory system 110 in accordance with an embodiment.

Figure 2:
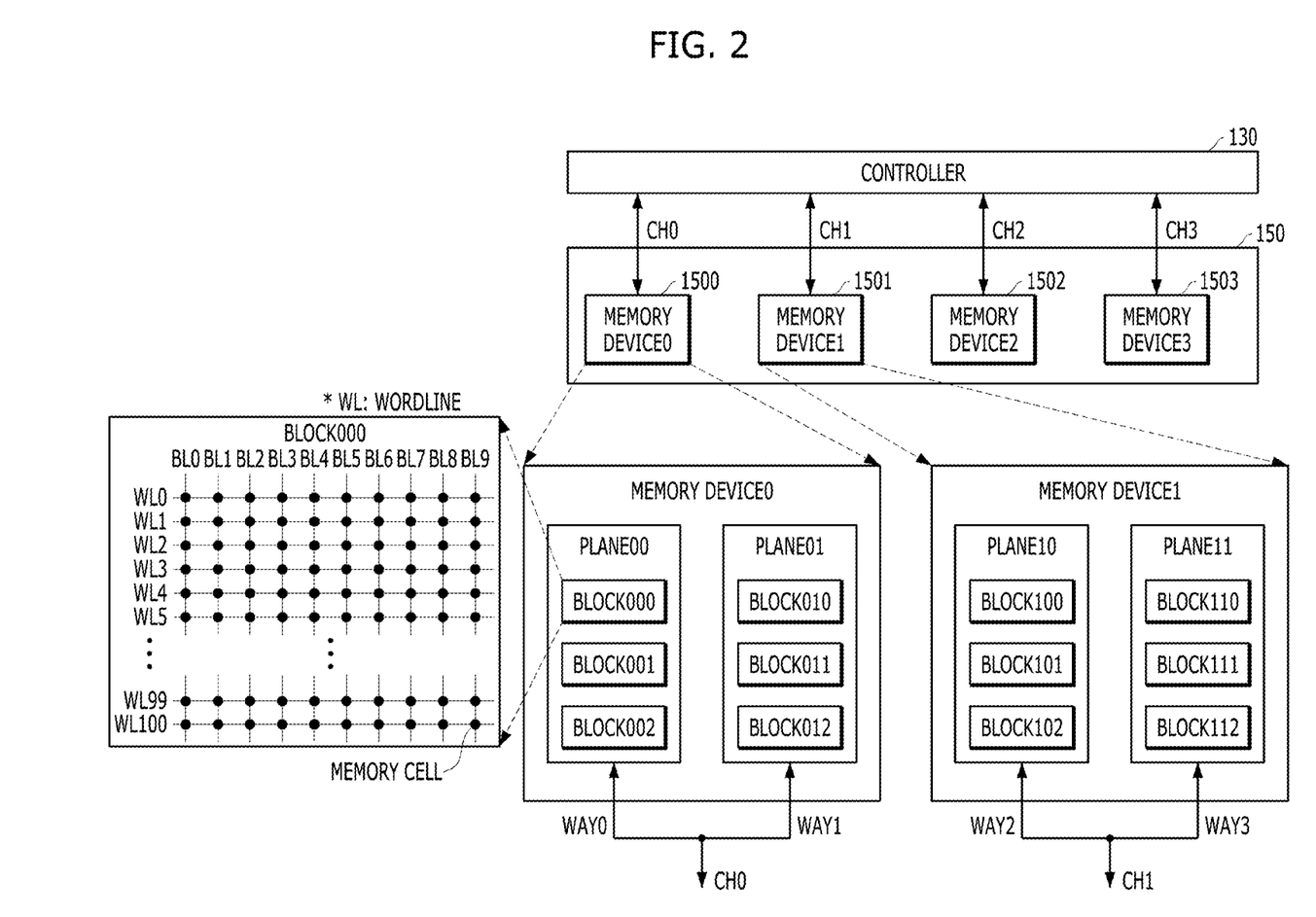
FIG. 2 illustrates a memory device included in the memory system of FIG. 1 in accordance with an embodiment.

FIG. 2 illustrates a memory device included in the memory system 110 of FIG. 1 in accordance with an embodiment.

The data processing system 100 of FIG. 1 may further include a host 102 engaged or operably coupled with the memory system 110.

The host 102 may include a portable electronic device such as a mobile phone, an MP3 player, a laptop computer, or the like, or an electronic device such as a desktop computer, a game player, a television (TV), a projector, or the like.

The host 102 may include at least one operating system (OS), which can generally manage and control functions and operations performed in the host 102. The OS may provide interoperability between the host 102 and a user of the memory system 110. The OS may support functions and operations corresponding to user's requests. By way of example but not limitation, the OS may include a general operating system, a mobile operating system, or both according to mobility of the host 102. The general operating system may include a personal operating system or an enterprise operating system according to system requirements or a user's environment. The personal operating system may be specialized to support a service providing function for general users, and may include Windows, Chrome, and so on. The enterprise operating systems may be specialized for securing and supporting high performance, and may include Windows servers, Linux, Unix, and so on. The mobile operating system may include an Android, an iOS, a Windows mobile, and so on. The mobile operating system may be subject to support services or functions for mobility (e.g., a power saving function).

The host 102 may include a plurality of operating systems. The host 102 may execute one or more operating systems to perform operations in cooperation with the memory system 110 according to user's requests. The host 102 may transmit a plurality of requests corresponding to the user's requests to the memory system 110, thereby performing operations corresponding to the plurality of requests within the memory system 110.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. The storage devices may include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and so on.

A storage device for the memory system 110 may be implemented with a volatile memory device, for example, a dynamic random access memory (DRAM), a static RAM (SRAM), or the like, and/or a nonvolatile memory device, for example, a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), a flash memory, or the like.

Referring to FIGS. 1 and 2, the memory system 110 may include a data storage device 150 for storing data accessed by the host 102 and a controller 130 for controlling a data storage operation of the data storage device 150.

The data storage device 150 and the controller 130 of the memory system 110 may be integrated into a single semiconductor device, which may be included in any of the various types of memory systems as exemplified above. The memory system 110 may form an SSD for improving an operating speed. When the memory system 110 is implemented with an SSD, the operating speed of the host 102 connected to the memory system 110 can be improved compared to when the host 102 is connected to a hard disk. In another embodiment, the memory system 110 may form a memory card such as a PC card (PCMCIA), a compact flash card (CF), a smart media card (e.g., SM or SMC), a memory stick, a multimedia card (e.g., MMC, RS-MMC, or MMCmicro), a secure digital (SD) card (e.g., SD, miniSD, microSD, or SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

Referring to FIGS. 1 and 2, the data storage device 150 in the memory system 110 may include a nonvolatile memory device capable of retaining data stored therein even though no power is supplied thereto. For example, the data storage device 150 may include a flash memory device. Therefore, the data storage device 150 may store data provided by the host 102 as nonvolatile data therein by performing a write operation, and provide data stored therein to the host 102 by performing a read operation.

More specifically, the data storage device 150 may include a plurality of memory devices 1500 to 1503. Each of the memory devices 1500 to 1503 may include a plurality of planes. Referring to FIG. 2, the memory device 1500 includes a plurality of planes PLANE00 and PLANE01, and the memory device 1501 includes a plurality of planes PLANE10 and PLANE11. Furthermore, each of the planes PLANE00, PLANE01, PLANE10, and PLANE11 may include a plurality of memory blocks. For example, the plane PLANE00 may include three memory blocks BLOCK000, BLOCK001, and BLOCK002, the plane PLANE01 may include three memory blocks BLOCK010, BLOCK011, and BLOCK012, the plane PLANE10 may include three memory blocks BLOCK100, BLOCK101, and BLOCK102, and the plane PLANE11 may include three memory blocks BLOCK110, BLOCK111, and BLOCK112. Each of the above memory blocks BLOCK000 to BLOCK112 may include a plurality of memory cells MEMORY CELL which are located at respective intersections between a plurality of wordlines WL<0:100> and a plurality of bitlines BL<0:9>, each of the plurality of memory cells MEMORY CELL storing one or more-bit data.

For reference, FIG. 1 illustrates that the data storage device 150 includes the four memory devices 1500 to 1503, but embodiments are not limited thereto. In another embodiment, the data storage device 150 may include one of various numbers of memory devices, for example, two or eight memory devices. FIG. 2 illustrates that one memory device includes two planes, but embodiments are not limited thereto. In another embodiment, one memory device may include one of various numbers of planes, for example, four or eight planes. Furthermore, FIG. 2 illustrates that one plane includes three memory blocks, but embodiments are not limited thereto. In another embodiment, one plane may include one of various numbers of memory blocks, for example, more than three memory blocks. Furthermore, FIG. 2 illustrates a configuration in which 101 wordlines WL<0:100> and 10 bitlines BL<0:9> are included in one memory block. However, one memory block may include one of various numbers of wordlines, e.g., more than 101 wordlines, and one of various numbers of bitlines, e.g., more than 10 bitlines.

The plurality of memory devices 1500 to 1503 included in the data storage device 150 may be coupled to the controller 130 through a plurality of channels CH0 to CH3, respectively. For example, the zeroth memory device 1500 may be coupled to the controller 130 through the zeroth channel CH0, the first memory device 1501 may be coupled to the controller 130 through the first channel CH1, the second memory device 1502 may be coupled to the controller 130 through the second channel CH2, and the third memory device 1503 may be coupled to the controller 130 through the third channel CH3.

For reference, FIG. 2 illustrates that the four memory devices 1500 to 1503 are coupled to the controller 130 through the four channels CH0 to CH3. However, the number of memory devices is not always equal to the number of channels. In another embodiment, one of various numbers of memory devices, for example, two or four memory devices, may be coupled to one channel. That is, the number of memory devices and the number of channels within the data storage device 150 can be changed according to the purpose of use and the performance requirement of the memory system 110.

When each of the memory devices 1500 to 1503 includes the plurality of planes and one memory device is coupled to one channel, each of the plurality of planes may be coupled to the channel through a way. Referring to FIG. 2, the two planes PLANE00 and PLANE01 included in the zeroth memory device 1500 may be coupled to the zeroth channel CH0 through a zeroth way WAY0 and a first way WAY1, respectively. Similarly, the two planes PLANE10 and PLANE11 included in the first memory device 1501 may be coupled to the first channel CH1 through a second way WAY2 and a third way WAY3, respectively.

For reference, FIG. 2 illustrates that two ways are coupled to one channel because two planes are included in one memory device. However, embodiments are not limited thereto, and the number of ways coupled to one channel may be determined depending on how many planes are coupled to one channel.

The plurality of memory devices 1500 to 1503 included in the data storage device 150 may be considered as modules different from one another and coupled to the controller 130 through a plurality of data paths such as the plurality of channels CH0 to CH3. When the plurality of memory devices 1500 to 1503 and the controller 130 exchange data through the plurality of data paths, the data may be exchanged between the plurality of memory devices 1500 to 1503 and the controller 130 in an interleaving manner. When the data are exchanged in the interleaving manner using the plurality of data paths, a data transfer rate can be higher than when the data are exchanged through one data path.

The plurality of memory devices 1500 to 1503 may include the plurality of memory blocks BLOCK000, BLOCK001, and BLOCK002, BLOCK010, BLOCK011, and BLOCK012, BLOCK100, BLOCK101, and BLOCK102, and BLOCK110, BLOCK111, and BLOCK112, respectively. Each of the plurality of memory blocks included in the plurality of memory devices 1500 to 1503 may be a single level cell (SLC) memory block or a multi-level cell (MLC) memory block according to the number of bits stored in one memory cell. Here, the SLC memory block includes a plurality of pages implemented by memory cells, each memory cell storing one bit of data. The SLC memory block can have high data input/output (I/O) operation performance and high durability. The MLC memory block includes a plurality of pages implemented by memory cells, each memory cell storing multi-bit data (e.g., two or more bits of data). The MLC memory block can have a larger storage capacity for the same space compared to the SLC memory block. The MLC memory block can be highly integrated in terms of storage capacity.

In an embodiment, each of the plurality of memory devices 1500 to 1503 may be implemented with MLC memory blocks, such as a double level cell memory block, a triple level cell (TLC) memory block, a quadruple level cell (QLC) memory block, or a combination thereof. The double level memory block may include a plurality of pages implemented by memory cells, each memory cell capable of storing 2-bit data. The triple level cell (TLC) memory block may include a plurality of pages implemented by memory cells, each memory cell capable of storing 3-bit data. The quadruple level cell (QLC) memory block may include a plurality of pages implemented by memory cells, each memory cell capable of storing 4-bit data. In another embodiment, the data storage device 150 may be implemented with a block including a plurality of pages implemented by memory cells, each memory cell capable of storing 5 or more bits of data.

In an embodiment, each of the plurality of memory devices 1500 to 1503 is a nonvolatile memory such as a flash memory, e.g., a NAND flash memory, a NOR flash memory, or the like. In another embodiment, the data storage device 150 may include at least one of a phase change random access memory (PCRAM), a ferroelectric random access memory (FRAM), and a spin injection magnetic memory (e.g., a spin transfer torque magnetic random access memory (STT-MRAM)).

Referring back to FIG. 1, the controller 130 in the memory system 110 controls the data storage device 150 in response to a request from the host 102. For example, the controller 130 provides the host 102 with data read from the data storage device 150, and stores data provided by the host 102 in the data storage device 150. For these operations, the controller 130 controls read, write, and erase operations of the data storage device 150.

The controller 130 may include a host interface (I/F) 132, a processor 134, an error correction code (ECC) unit 138, a power management unit (PMU) 140, a memory interface (I/F) 142, and a memory 144.

The host Interface 132 in the controller 130 may process requests and data provided by the host 102, and may communicate with the host 102 through at least one of various interface protocols such as a universal serial bus (USB), a multimedia card (MMC), a peripheral component interconnect-express (PCI-e or PCIe), a small computer system interface (SCSI), a serial-attached SCSI (SAS), a serial advanced technology attachment (SATA), a parallel advanced technology attachment (PATA), a small computer system interface (SCSI), an enhanced small disk interface (ESDI), and integrated drive electronics (IDE). In accordance with an embodiment, the host interface 132 may exchange data with the host 102, and may be implemented by firmware called a host interface layer (HIL).

The ECC unit 138 may correct error bits of data outputted from the data storage device 150, and may include an ECC encoder and an ECC decoder. Here, the ECC encoder may perform error correction encoding on data to be programmed in the data storage device 150 and generate encoded data into which ECC information is added. The ECC decoder may detect and correct error bits contained in data read from the data storage device 150 when the controller 130 reads the data stored in the data storage device 150. In other words, after performing error correction decoding on the data read from the data storage device 150, the ECC unit 138 may determine whether the error correction decoding has succeeded and output an instruction signal, e.g., a correction success signal or a correction fail signal. The ECC unit 138 may use the ECC information, which has been generated during the error correction encoding, to correct the error bits contained in the read data. When the number of error bits contained in the read data is greater than or equal to the number of correctable error bits, the ECC unit 138 may not correct the error bits, and instead may output the correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or a combination thereof. The ECC unit 138 may include any of circuits, modules, systems, and devices for performing the error correction operation based on at least one of the above described codes.

The memory interface 142 may serve as an interface for handling commands and data transferred between the controller 130 and the data storage device 150, thereby allowing the controller 130 to control the data storage device 150 in response to a request delivered from the host 102. The memory interface 142 may generate a control signal to control the data storage device 150 and may process data to be programmed into or outputted from the data storage device 150 under the control of the processor 134 when the data storage device 150 is a flash memory and, in particular, when the data storage device 150 is a NAND flash memory. The memory interface 142 may provide an interface for handling commands and data transmitted between the controller 130 and the data storage device 150. In accordance with an embodiment, the memory interface 142 may be implemented by firmware called a flash interface layer (FIL).

The memory 144 may support operations performed by the memory system 110 and the controller 130. The memory 144 may store temporary or transactional data generated or delivered for operations in the memory system 110 and the controller 130. The controller 130 may control the data storage device 150 in response to a request from the host 102. The controller 130 may deliver data read from the data storage device 150 to the host 102. The memory 144 may temporarily store data to be programmed into the data storage device 150. The memory 144 may be used to store data required for the controller 130 and the data storage device 150 to perform operations such as read operations or program/write operations.

The memory 144 may store data for performing operations such as data writing and data reading operations requested by the host 102 and/or store data transmitted between the data storage device 150 and the controller 130 to perform background operations such as garbage collection and wear levelling. In accordance with an embodiment, for supporting operations in the memory system 110, the memory 144 may include one or more of a program memory, a data memory, a write buffer/cache, a read buffer/cache, a data buffer/cache, and a map buffer/cache.

The memory 144 may be implemented with a volatile memory. For example, the memory 144 may be implemented with an SRAM (Static Random Access Memory) or a DRAM (Dynamic Random Access Memory). Furthermore, as illustrated in FIG. 1, the memory 144 may be present inside or outside the controller 130. When the memory 144 is present outside the controller 130, data may be transmitted between the memory 144 and the controller 130 through a separate memory interface (not illustrated).

The processor 134 may be implemented with a microprocessor or a central processing unit (CPU). The memory system 110 may include one or more processors. The processor 134 may control the overall operations of the memory system 110. By way of example but not limitation, the processor 134 may control a program operation or a read operation of the data storage device 150 in response to a write request or a read request provided by the host 102. In accordance with an embodiment, the processor 134 may use or execute firmware to control the overall operations of the memory system 110. Herein, the firmware may be a flash translation layer (FTL). The FTL may serve as an interface between the host 102 and the data storage device 150. The host 102 may transmit requests for write and read operations to the data storage device 150 through the FTL.

The FTL may manage operations of address mapping, garbage collection, wear-leveling, and so forth. Particularly, the FTL may load, generate, update, or store map data. Therefore, the controller 130 may map a logical address, which is provided by the host 102, with a physical address of the data storage device 150 through the use of the map data. The address mapping operation allows the data storage device 150 to function as a general storage device that performs a read or write operation. Using the address mapping operation based on the map data, when the controller 130 updates data stored in a particular page of the data storage device 150, the controller 130 may program updated data in an empty page that is different from the particular page and may invalidate the data stored in the particular page. In addition, the controller 130 may update a physical address, corresponding to a logical address of the updated data, with a physical address of the page in which the updated data is programmed as necessitated by a characteristic of a flash memory device. Further, the controller 130 may store map data corresponding to the physical address of the page in which the updated data is programmed into the FTL.

For example, when performing an operation requested by the host 102 in the data storage device 150, the controller 130 uses the processor 134. The processor 134 engaged with the data storage device 150 may handle instructions or commands corresponding to a request from the host 102. The controller 130 may perform, as a foreground operation, a command operation corresponding to the request from the host 102, such as a program operation corresponding to a write command, a read operation corresponding to a read command, an erase/discard operation corresponding to an erase/discard command, or a parameter set operation corresponding to a set parameter command or a set feature command as a set command.

The controller 130 may also perform a background operation on the data storage device 150 using the processor 134. By way of example but not limitation, the background operation for the data storage device 150 includes a garbage collection (GC) operation of copying data stored in a memory block and storing the copied data in another memory block. The background operation may further include a wear leveling (WL) operation of moving data stored in at least one of the plurality of memory blocks BLOCK000 to BLOCK112 in the data storage device 150 into at least another one of the plurality of memory blocks BLOCK000 to BLOCK112. During the background operation, the controller 130 may use the processor 134 to perform a map flush operation of storing the map data stored in the controller 130 to at least one of the plurality of memory blocks BLOCK000 to BLOCK112. The background operation performed by the processor 134 may further include a bad block management operation of checking for bad memory blocks among the plurality of memory blocks BLOCK000 to BLOCK112.

A management unit (not shown) may be included in the processor 134. The management unit may perform the bad block management operation on the data storage device 150. The management unit may find bad memory blocks, which are in an unsatisfactory condition for further use, and perform the bad block management operation on the bad memory blocks. When the data storage device 150 is a flash memory, for example, a NAND flash memory, a program failure may occur during a program operation due to characteristics of a NAND logic function. While performing the bad block management operation, data of a program-failed memory block or data supposed to be programmed into a bad memory block may be programmed into a new memory block. The bad memory blocks may significantly deteriorate the utilization efficiency of the data storage device 150 having a three-dimensional (3D) stack structure and the reliability of the memory system 110. Thus, reliable bad block management may be required to enhance or improve performance of the memory system 110.

Figure 3:
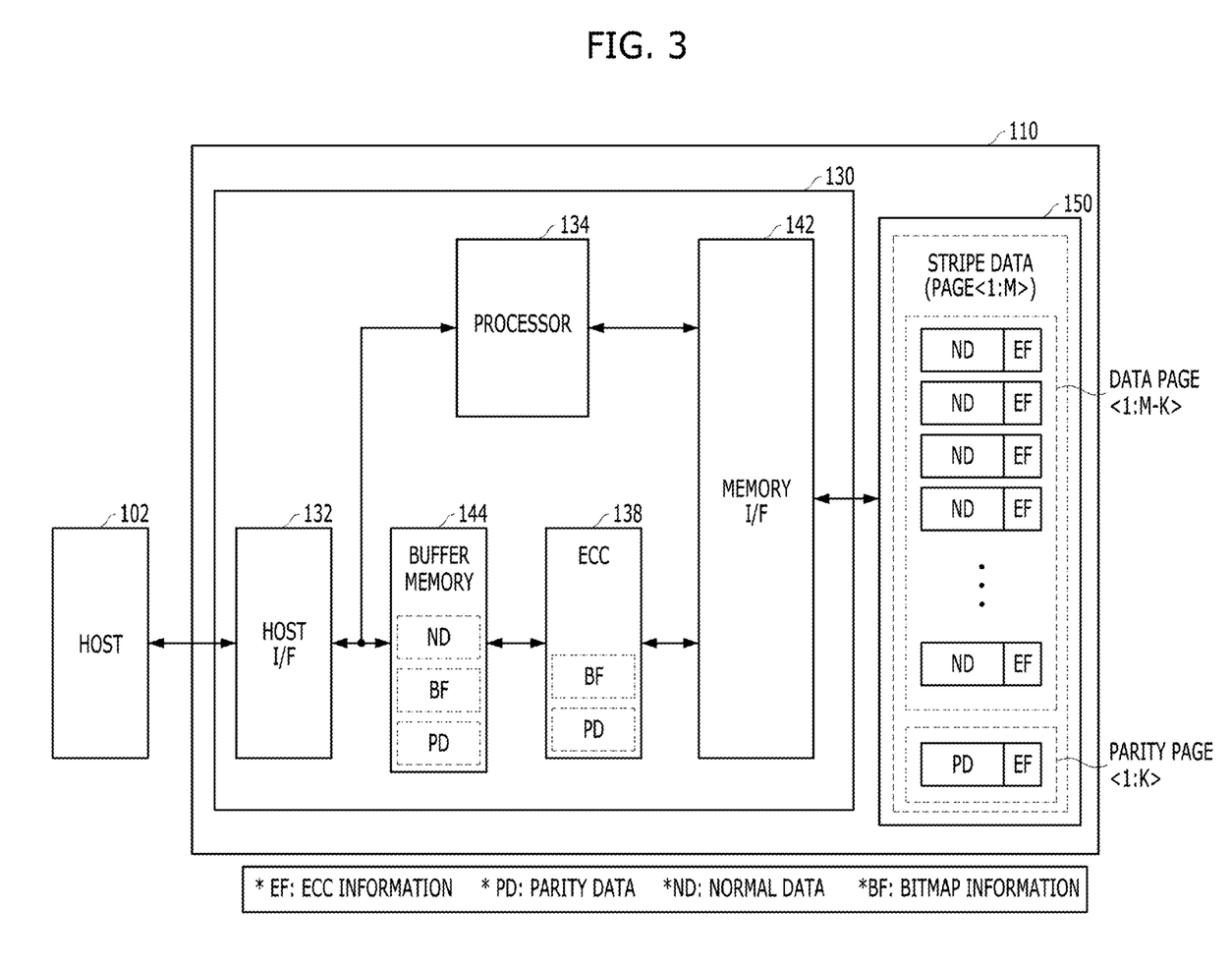
FIG. 3 illustrates an operation for accessing data in stripe form in the memory system of FIG. 1 in accordance with an embodiment.

FIG. 3 illustrates an operation for accessing data in stripe form in a memory system 110 in accordance with an embodiment.

Referring to FIG. 3, the memory system 110 may include a data storage device 150 for storing data accessed by a host 102 and a controller 130 for controlling the data storage device 150. The controller 130 may include a host interface 132, a processor 134, a buffer memory 144, an ECC unit 138, and a memory interface 142. The buffer memory 144 corresponds to the memory 144 described above with reference to FIG. 1. FIG. 3 illustrates a case in which the buffer memory 144 is used as a data buffer memory for storing data to be read from or written in the data storage device 150.

Specifically, the controller 130 may access data in the stripe form between the data storage device 150 and the controller 130.

When the controller 130 accesses data in the stripe form between the data storage device 150 and the controller 130, it may indicate that the controller 130 accesses the data in the stripe form, obtained by grouping user data ND+EF of a data page DATA PAGE and parity data PD+EF of a parity page PARITY PAGE, between the data storage device 150 and the controller 130. That is, when the controller 130 accesses the data in the stripe form between the data storage device 150 and the controller 130, the controller 130 may group a plurality of pages PAGE including the data page DATA PAGE and the parity page PARITY PAGE, and transmit the grouped pages PAGE to the data storage device 150. For example, when accessing the data in the stripe form between the data storage device 150 and the controller 130, the controller 130 may group user data ND+EF of (M-K) data pages DATA PAGE<1:M-K> and parity data PD+EF of K parity pages PARITY PAGE<1:K>, and transmit the grouped data, i.e., stripe data STRIPE DATA, to the data storage device 150. For reference, M is a natural number equal to or more than 2, and K is a natural number equal to or more than 1 and equal to or less than M.

More specifically, an operation of storing the stripe data STRIPE DATA in the data storage device 150 will be described hereinafter.

First, the controller 130 may receive normal data ND with a write request from the host 102 through the host interface 132. The controller 130 may store the normal data ND, received from the host 102, in the buffer memory 144 before transmitting the normal data ND to the data storage device 150.

The controller 130 may transmit the stripe data STRIPE DATA, generated by grouping the normal data ND stored in the buffer memory 144 with parity data PD, to the data storage device 150, in order to store the stripe data STRIPE DATA in the data storage device 150.

For this operation, the controller 130 may generate the parity data PD by performing a parity operation, for example, an XOR operation, on the normal data ND stored in the buffer memory 144 through the use of the ECC unit 138 included therein.

The controller 130 may further generate ECC information EF by performing an error correction encoding operation on the normal data ND and the parity data PD through the use of the ECC unit 138 included therein. In an embodiment, the controller 130 may generate ECC information EF corresponding to the normal data ND and ECC information EF corresponding to the parity data PD, and group the normal data ND, the parity data PD, and the generated ECC information as the stripe data STRIPE DATA.

Therefore, the stripe data STRIPE DATA transmitted to the data storage device 150 from the controller 130 may be generated by grouping the user data ND+EF of the data page DATA PAGE including the normal data ND and the ECC information EF corresponding to the normal data ND and the parity data PD+EF of the parity page PARITY PAGE including the parity data PD and the ECC information EF corresponding to the parity data PD. For example, the stripe data STRIPE DATA including the user data ND+EF and the parity data PD+EF may be stored in the M pages PAGE<1:M> as illustrated in FIG. 3. That is, the controller 130 may transmit, to the data storage device 150, the stripe data STRIPE DATA including the user data ND+EF and the parity data PD+EF on a page basis according to a preset order in order to store the user data ND+EF and the parity data PD+EF in the M pages PAGE<1:M>. At this time, the user data ND+EF may include (M-K) pieces of the normal data ND and (M-K) pieces of the ECC information EF corresponding to the normal data ND that are stored in the (M-K) data pages DATA PAGE<1:M-K>, and the parity data PD+EF may include K pieces of the parity data PD and K pieces of the ECC information EF corresponding to the parity data PD that are stored in the K parity pages PARITY PAGE<1:K>. For reference, M is a natural number equal to or more than 2, and K is a natural number equal to or more than 1 and equal to or less than M. FIG. 3 illustrates only one parity page PARITY PAGE under the supposition that K is 1, but this is only an embodiment. According to a designer's selection, K may be set to a natural number larger than 1.

Furthermore, an operation of reading the stripe data STRIPE DATA from the data storage device 150 will be described hereinafter.

First, the controller 130 may receive a read request from the host 102. The controller 130 may read the M pages PAGE<1:M> storing the stripe data STRIPE DATA from the data storage device 150 on a page basis according to a preset order. That is, the controller 130 may read (M-K) data pages DATA PAGE<1:M-K> and K parity pages PARITY PAGE<1:K> on the page basis according to the preset order in order to read the stripe data STRIPE DATA stored in the M pages PAGE<1:M> on the page basis according to the preset order.

At this time, the controller 130 may generate bitmap information BF for distinguishing a 'first page' on which the read operation has succeeded from a 'second page' on which the read operation has failed, among the M pages PAGE<1:M>, whenever performing the read operation on the M pages PAGE<1:M> on the page basis according to the preset order, and store the generated bitmap information BF in the buffer memory 144. The 'first page' may be referred to as a 'success page,' and the 'second page' may be referred to as a 'failure page.'

For example, when it is assumed that M is 5, the controller 130 may read five pages on the page basis according to the preset order. That is, the controller 130 may perform the read operation five times to read the stripe data STRIPE DATA stored in the five pages. At this time, among the five pages, the read operations performed on the first to third pages and the fifth page may succeed, and the read operation performed on the fourth page may fail. In this case, among the five pages, the controller 130 may sort each of the first to third pages and the fifth page as the ' success page' and sort the fourth page as the 'failure page.' The controller 130 may generate the bitmap information BF including five bits respectively corresponding to the five pages. At this time, among the five bits included in the bitmap information BF, the bits corresponding to the first to third pages and the fifth page on which the read operations have succeeded may be set to '1.' Similarly, the bit corresponding to the fourth page on which the read operation has failed may be set to '0.' That is, the bitmap information BF including the five bits may be set to '1 1 1 0 1' respectively corresponding to the first to fifth pages.

The controller 130 may read the M pages PAGE<1:M> storing the stripe data STRIPE DATA on the page basis according to the preset order, and perform an error correction decoding operation on the stripe data STRIPE DATA using the ECC information EF included in the stripe data STRIPE DATA through the use of the ECC unit 138. That is, the controller 130 may check whether an error occurs in data of a page read according to the preset order, among the stripe data STRIPE DATA stored in the M pages PAGE<1:M>. When an error occurred in the data of the page, the controller 30 may perform the error correction decoding operation on the data of the page that includes the error.

When no error occurs in the data of the page read according to the preset order among the stripe data STRIPE DATA stored in the M pages PAGE<1:M>, the controller 130 may determine that the read operation for the page has succeeded, and sort the corresponding page as the 'success page.' The controller 130 may output the data of the page sorted as the 'success page' to the host 102.

When the error correction decoding operation has succeeded even though the error occurred in the data of the page read according to the preset order, among the M pages PAGE<1:M>, the controller 130 may determine that the read operation for the page has succeeded, and thus sort the corresponding page as the 'success page.' The controller 130 may output the data of the page sorted as the 'success page' to the host 102.

When the error occurred in the data of the page read according to the preset order among the stripe data STRIPE DATA stored in the M pages PAGE<1:M> and the error correction decoding operation performed on the data has failed, the controller 130 may determine that the read operation on the page has failed, and sort the corresponding page as the 'failure page.' The controller 130 may not output the data of the page sorted as the 'failure page' to the host 102.

At this time, whenever the operation of reading the M pages PAGE<1:M> on the page basis according to the preset order succeeds or any one of the M pages PAGE<1:M> is sorted as the 'success page,' the controller 130 may generate and store parity data PD in the buffer memory 144, the parity data PD being generated by cumulatively performing a parity operation on data of pages each sorted as the 'success page.' That is, before outputting the data of the page sorted as the 'success page' to the host 102, the controller 130 may generate the parity data PD by cumulatively performing the parity operation on the data of the pages each sorted as the 'success page.'

After the parity data PD is generated and stored in the buffer memory 144, the controller 130 may output the data of the pages each sorted as the 'success page' to the host 102, the data being used for generating the parity data PD. For reference, whenever performing the read operation on the M pages PAGE<1:M> on the page basis according to the preset order, the controller 130 may store a predetermined number of data, among data of the read page, in the buffer memory 144 according to a least recently used (LRU) method.

That is, the data of the page sorted as the 'success page' may not be outputted to the host 102 but be stored in the buffer memory 144 during a predetermined period until the predetermined number of data are newly stored in the buffer memory 144, even after the data of the page is used for generating the parity data PD through the parity operation. For convenience of description, however, the following embodiments will be based on the supposition that the data of the page sorted as the 'success page' is used for generating the parity data PD through the parity operation and then immediately outputted to the host 102.

For example, when it is assumed that M is 5, the controller 130 may read five pages on the page basis according to the preset order. That is, the controller 130 may perform five read operations to read data stored in the five pages. At this time, when the read operation performed on the first page of the five pages succeeds, the controller 130 may generate the bitmap information BF to sort the first page as the 'success page' and simultaneously generate the parity data PD by performing a parity operation on the data read from the first page sorted as the 'success page.' Then, the controller 130 may output data read from the first page to the host 102. At this time, after outputting the data read from the first page to the host 102, the controller 130 may delete or release the data read from the first page from the buffer memory 144.

Then, when the read operation performed on the second page of the five pages, which is performed after the read operation performed on the first page, succeeds, the controller 130 may update the bitmap information BF by sorting each of the first and second pages as the 'success page' and simultaneously update the parity data PD generated as the result of performing the parity operation on the first page by cumulatively performing a parity operation on the data read from the second page. Then, the controller 130 may output the data read from the second page to the host 102. That is, the controller 130 may update the parity data PD according to the result of cumulatively performing the parity operation on the first and second pages each sorted as the 'success page,' and then output the data read from the second page to the host 102. At this time, the controller 130 may output the data read from the second page to the host 102, and then delete or release the data, read from the second page, from the buffer memory 144.

Then, when the read operation performed on the third page of the five page, which is performed after the read operation performed on the second page, succeeds, the controller 130 may update the bitmap information BF by sorting the first to third pages each as the 'success page' and simultaneously update the parity data PD generated as the results of performing the parity operations on the first and second pages by cumulatively performing a parity operation on the data read from the third page. Then, the controller 130 may output the data read from the third page to the host 102. That is, the controller 130 may update the parity data PD according to the result of cumulatively performing the parity operation on the first to third pages each sorted as the 'success page,' and then output the data read from the third page to the host 102. At this time, after outputting the data read from the third page to the host 102, the controller 130 may delete or release the data, read from the third page, from the buffer memory 144.

Then, when the read operation performed on the fourth page of the five pages, which is performed after the read operation performed on the third page, fails, the controller 130 may update the bitmap information BF by sorting the fourth page as the 'failure page.' In this case, since the fourth page is sorted as the 'failure page,' the parity operation is not performed on the fourth page.

Then, when the read operation performed on the fifth page of the five pages, which is performed after the read operation performed on the fourth page, succeeds, the controller 130 may update the bitmap information BF by sorting the first to third pages and the fifth page each as the 'success page' and simultaneously update the parity data PD generated as the result of performing the parity operations on the first to third pages by cumulatively performing a parity operation on the data read from the fifth page. Then, the controller 130 may output the data read from the fifth page to the host 102. That is, the controller 130 may update the parity data PD according to the result of cumulatively performing the parity operations on the first to third pages and the fifth page each sorted as the 'success page,' and then output the data read from the fifth page to the host 102. At this time, after outputting the data read from the fifth page to the host 102, the controller 130 may delete or release the data, read from the fifth page, from the buffer memory 144.

For reference, the parity operation for generating the parity data PD may include an XOR operation. That is, the XOR operation is performed on the data read from the first to third pages and the fifth page each sorted as the 'success page' to generate and update the parity data PD.

After the read operations performed on the M pages PAGE<1:M> storing the stripe data STRIPE DATA are competed, the controller 130 may check the bitmap information BF stored in the buffer memory 144 in order to check whether a failure page is present among the M pages PAGE<1:M> on which the read operations are completed. When the checked result of the bitmap information BF stored in the buffer memory 144 indicates that there is the failure page among the M pages PAGE<1:M>, the controller 130 may recover the data of the failure page by referring to the parity data PD stored in the buffer memory 144. That is, the ECC unit 138 included in the controller 130 may recover the data of the failure page on which the read operation has failed using the parity data PD stored in the buffer memory 144. In an embodiment, the recovery operation on the data of the failure page includes performing an XOR operation on the data of the failure page and the parity data PD.

At this time, when the ECC unit 138 succeeds in recovering the data of the failure page, the controller 130 may output the data of the failure page, which has been successfully recovered by the ECC unit 138, as read data to the host 102. That is, the data of the success pages, which have already been outputted to the host 102, and the data of the failure page, which has been recovered by the ECC unit 138, may be outputted as the read data to the host 102. On the other hand, when the ECC unit 138 fails to recover the data of the failure page, the controller 130 may output only the data of the success pages as the read data to the host 102. When the checked result of the bitmap information BF stored in the buffer memory 144 indicates that no failure page is present or only success pages are present in the M pages PAGE<1:M>, the controller 130 may output the data of the success pages as the read data to the host 102.

Figure 4A:
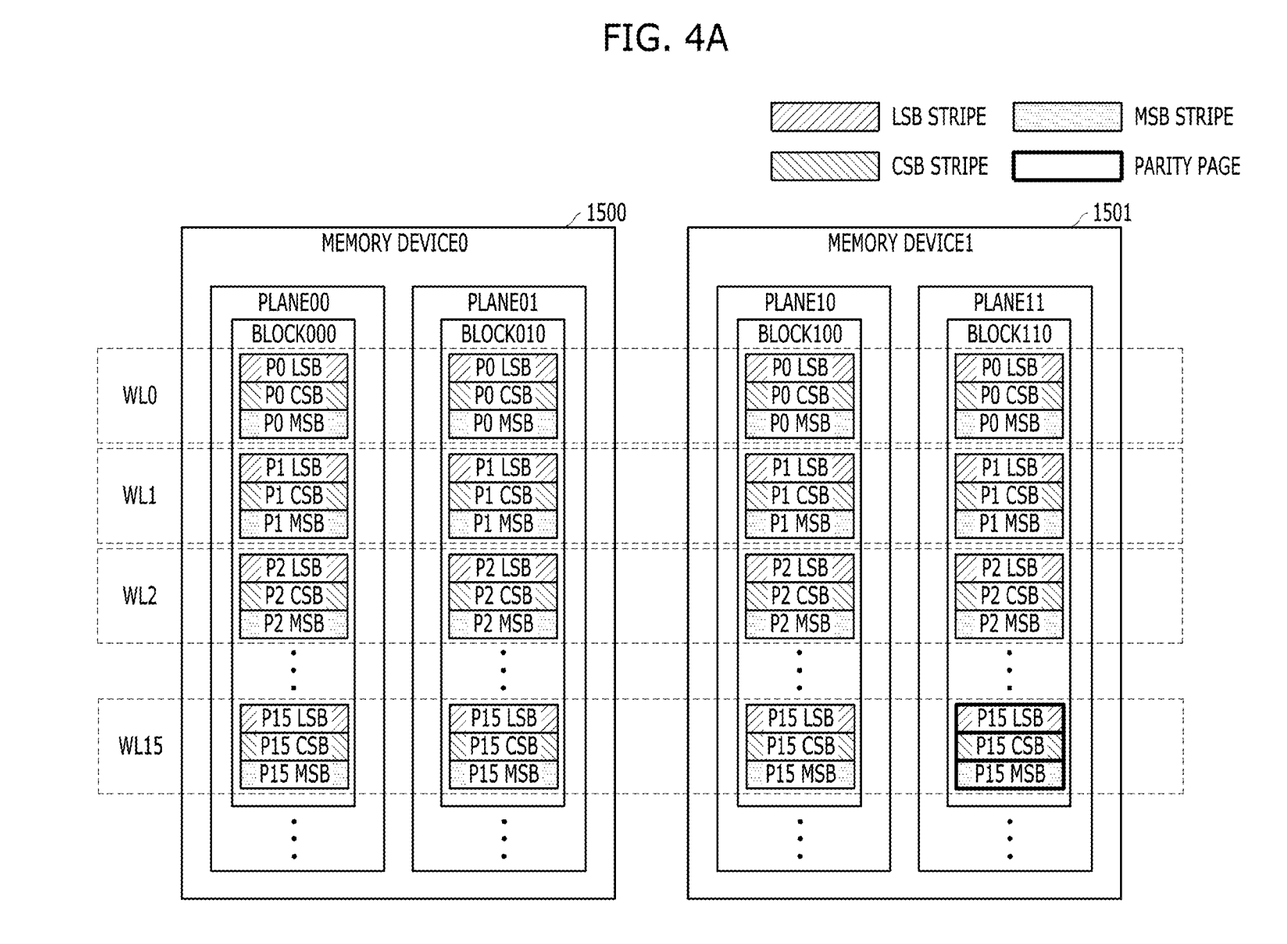
FIGS. 4A and 4B illustrate an operation for reading data in stripe form in the memory system of FIG. 1 in accordance with an embodiment.
Figure 4B:
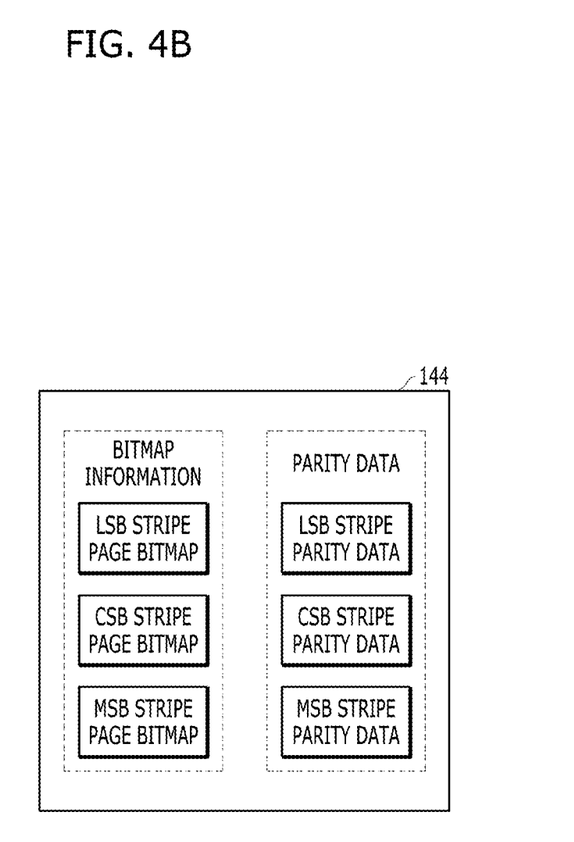

FIGS. 4A and 4B illustrate an operation for reading data in stripe form in a memory system in accordance with an embodiment. The operation illustrated in FIGS. 4A and 4B will be described with reference to the memory system 110 shown in FIGS. 2 and 3.

FIGS. 2, 3, and 4A may be based on the supposition that three stripe data LSB STRIPE, CSB STRIPE, and MSB STRIPE are stored in the zeroth memory device 1500 and the first memory device 1501 among the plurality of memory devices 1500 to 1503 included in the data storage device 150.

Specifically, as described above with reference to FIG. 2, the zeroth memory device 1500 may include the plurality of planes PLANE00 and PLANE01, and the first memory device 1501 may include the plurality of planes PLANE10 and PLANE11. Furthermore, the plane PLANE00 may include the plurality of memory blocks BLOCK000, BLOCK001, and BLOCK002, the plane PLANE01 may include the plurality of memory blocks BLOCK010, BLOCK011, and BLOCK012, the plane PLANE10 may include the plurality of memory blocks BLOCK100, BLOCK101, and BLOCK102, and the plane PLANE11 may include the plurality of memory blocks BLOCK110, BLOCK111 and BLOCK112. Each of the memory blocks BLOCK000, BLOCK001, BLOCK002, BLOCK010, BLOCK011, BLOCK012, BLOCK100, BLOCK101, BLOCK102, BLOCK110, BLOCK111, and BLOCK112 may include a plurality of memory cells MEMORY CELL which are located at respective intersections between a plurality of wordlines WL<0:100> and a plurality of bitlines BL<0:9>, which are arranged in an array, each memory cell capable of storing one or more-bit data.

FIG. 4A illustrates each of the planes PLANE00, PLANE01, PLANE10, and PLANE11 that includes one or more memory blocks BLOCK000, . . . , BLOCK010, . . . , BLOCK100, . . . , and BLOCK110, . . . , each more memory block including 16 wordlines WL<0:15>. Each of the 16 wordlines WL<0:15> is coupled to a plurality of cells MEMORY CELL, each of which stores N-bit data. Here, N is a natural number equal to or more than 2, and the following descriptions will be based on the supposition that N is 3. That is, the following descriptions will be based on the supposition that each of the memory cells MEMORY CELL is a TLC (triple level cell) capable of storing 3-bit data, the 3-bit data including a most significant bit (MSB), a center significant bit (CSB), and a least significant bit (LSB).

Since each of the memory cells MEMORY CELL is a TLC capable of storing 3-bit data as supposed above, the plurality of memory cells MEMORY CELL coupled to each of the 16 wordlines WL<0:15> may include three logical pages, i.e., an LSB page, a CSB page, and an MSB page.

More specifically, referring to FIG. 4A, the controller 130 may select one or more memory devices, e.g., the memory devices 1500 and 1501 in order to read data in the stripe form. Furthermore, the controller 130 may select one or more blocks, e.g., BLOCK000, BLOCK010, BLOCK100, and BLOCK110, among the plurality of blocks included in the selected memory devices 1500 and 1501. Furthermore, the controller 130 may select one or more of the plurality of wordlines WL<0:15> included in each of the selected blocks BLOCK000, BLOCK010, BLOCK100, and BLOCK110.

Referring to FIGS. 3 and 4A, the controller 130 may select one of three logical pages corresponding to memory cells coupled to each of the wordlines WL<0:15> according to a preset order, and sort data of the selected pages as stripe data STRIPE DATA. For each of the three logical pages including the LSB page, the CSB page, and the MSB page, the controller 130 may select M pages PAGE<1:M> and sort data of the M pages PAGE<1:M> as the stripe data STRIPE DATA.

For example, the controller 130 may determine LSB stripe data LSB STRIPE by selecting 64 LSB pages among the logical pages corresponding to the memory cells coupled to the wordlines WL<0:15> that are included in the selected memory blocks BLOCK000, BLOCK010, BLOCK100, and BLOCK110, according to the preset order. Similarly, the controller 130 may determine CSB stripe data CSB STRIPE by selecting 64 CSB pages among the logical pages corresponding to the memory cells coupled to the wordlines WL<0:15> that are included in the selected memory blocks BLOCK000, BLOCK010, BLOCK100, and BLOCK110, according to the preset order. Similarly, the controller 130 may determine MSB stripe data MSB STRIPE by selecting 64 MSB pages among the logical pages corresponding to the memory cells coupled to the wordlines WL<0:15> that are included in the selected memory blocks BLOCK000, BLOCK010, BLOCK100, and BLOCK110, according to the preset order.

Here, the preset order in which the controller 130 selects the 64 LSB pages may correspond to an order in which the controller 130 selects an LSB page P0 LSB coupled to the zeroth wordline WL<0> from the zeroth memory block BLOCK000 included in the zeroth memory device 1500, selects an LSB page P0 LSB coupled to the zeroth wordline WL<0> from the first memory block BLOCK010 included in the zeroth memory device 1500, selects an LSB page P0 LSB coupled to the zeroth wordline WL<0> from the zeroth memory block BLOCK100 included in the first memory device 1501, selects an LSB page P0 LSB coupled to the zeroth wordline WL<0> from the first memory block BLOCK110 included in the first memory device 1501, selects an LSB page P1 LSB coupled to the first wordline WL<1> from the zeroth memory block BLOCK000 included in the zeroth memory device 1500, and then sequentially selects the other LSB pages coupled to the wordlines<1:15> from the memory blocks BLOCK000, BLOCK010, BLOCK100, and BLOCK110 included in the zeroth memory devices 1500 and the first memory device 1501. Furthermore, the controller 130 may set, as a parity page PARITY PAGE, a page, which is selected for the last time according to the preset order, among the 64 LSB pages corresponding to the LSB stripe data LSB STRIPE. That is, an LSB page P0 LSB coupled to the 15th wordline WL<15> in the first memory block BLOCK110 included in the first memory device 1501 is set as the parity page PARITY PAGE for the LSB stripe data LSB STRIPE.

Referring to FIGS. 3, 4A, and 4B, the controller 130 may generate three sets of bitmap information BITMAP INFORMATION and three parity data PARITY DATA by reading data stored in M pages PAGE<1:M>, i.e., each of the three stripe data LSB STRIPE, CSB STRIPE, and MSB STRIPE, from the data storage device 150 and performing a parity operation on the read data, and store the generated bitmap information BITMAP INFORMATION and the parity data PARITY DATA in the buffer memory 144. Referring to FIG. 4A, M may be 64.

For example, the controller 130 may generate LSB stripe page bitmap information LSB STRIPE PAGE BITMAP and LSB stripe parity data LSB STRIPE PARITY DATA for the 64 LSB pages corresponding to the LSB stripe data LSB STRIPE, and store the generated bitmap information LSB STRIPE PAGE BITMAP and parity data LSB STRIPE PARITY DATA in the buffer memory 144. In particular, whenever completing an operation of reading data stored in each of the 64 LSB pages among the LSB stripe data LSB STRIPE according to the preset order, the controller 130 may generate or update the LSB stripe page bitmap information LSB STRIPE PAGE BITMAP for distinguishing a success page on which the read operation has succeeded from a failure page on which a read operation has failed, among the 64 LSB pages of the LSB stripe data LSB STRIPE, and store the generated or updated bitmap information LSB STRIPE PAGE BITMAP in the buffer memory 144 separately from an operation of outputting the data read from the page, on which the read operation has succeeded, to the host 102.

Furthermore, whenever the operation of reading the data stored in each of the 64 LSB pages among the LSB stripe data LSB STRIPE according to the preset order succeeds, the controller 130 may perform a cumulative parity operation on the read data in order to generate or update the LSB stripe parity data LSB STRIPE PARITY DATA and store the LSB stripe parity data LSB STRIPE PARITY DATA in the buffer memory 144, the cumulative parity operation being separately performed from the operation of outputting the data of the page, on which the read operation has succeeded, to the host 102. Therefore, even after the data of the page is outputted to the host 102, the controller 130 may check the LSB stripe page bitmap information LSB STRIPE PAGE BITMAP stored in the buffer memory 144 in order to check whether a failure page is present among the 64 LSB pages of the LSB stripe data LSB STRIPE. When the failure page is present among the 64 LSB pages of the LSB stripe data LSB STRIPE, the controller 130 may recover data of the failure page by referring to the LSB stripe parity data LSB STRIPE PARITY DATA stored in the buffer memory 144.

Similarly, the controller 130 may generate CSB stripe page bitmap information CSB STRIPE PAGE BITMAP and CSB stripe parity data CSB STRIPE PARITY DATA for the 64 CSB pages corresponding to the CSB stripe data CSB STRIPE, and store the generated bitmap information CSB STRIPE PAGE BITMAP and parity data CSB STRIPE PARITY DATA in the buffer memory 144. In particular, whenever completing an operation of reading data stored in each of the 64 CSB pages among the CSB stripe data CSB STRIPE according to the preset order, the controller 130 may generate or update the CSB stripe page bitmap information CSB STRIPE PAGE BITMAP for distinguishing a success page on which the read operation has succeeded from a failure page on which the read operation has failed, among the 64 CSB pages of the CSB stripe data CSB STRIPE, and store the generated or updated bitmap information CSB STRIPE PAGE BITMAP in the buffer memory 144 separately from an operation of outputting the data read from the page, on which the read operation has been succeeded, to the host 102.

Furthermore, whenever the operation of reading the data stored in each of the 64 CSB pages among the CSB stripe data CSB STRIPE according to the preset order succeeds, the controller 130 may perform a cumulative parity operation on the read data in order to generate or update the CSB stripe parity data CSB STRIPE PARITY DATA and store the CSB stripe parity data CSB STRIPE PARITY DATA in the buffer memory 144, the cumulative parity operation being separately performed from the operation of outputting the data of the page, where the read operation has succeeded, to the host 102. Therefore, even after the data of the page is outputted to the host 102, the controller 130 may check the CSB stripe page bitmap information CSB STRIPE PAGE BITMAP stored in the buffer memory 144 in order to check whether a failure page is present among the 64 CSB pages of the CSB stripe data CSB STRIPE. When the failure page is present among the 64 CSB pages of the CSB stripe data CSB STRIPE, the controller 130 may recover data of the failure page by referring to the CSB stripe parity data CSB STRIPE PARITY DATA stored in the buffer memory 144.

Similarly, the controller 130 may generate MSB stripe page bitmap information MSB STRIPE PAGE BITMAP and MSB stripe parity data MSB STRIPE PARITY DATA for the 64 MSB pages corresponding to the MSB stripe data MSB STRIPE, and store the generated bitmap information MSB STRIPE PAGE BITMAP and parity data MSB STRIPE PARITY DATA in the buffer memory 144. In particular, whenever completing an operation of reading data stored in each of the 64 MSB pages among the MSB stripe data MSB STRIPE according to the preset order, the controller 130 may generate or update the MSB stripe page bitmap information MSB STRIPE PAGE BITMAP for distinguishing a success page on which the read operation has succeeded from a failure page on which the read operation has failed, among the 64 MSB pages of the MSB stripe data MSB STRIPE, and store the generated or updated bitmap information MSB STRIPE PAGE BITMAP in the buffer memory 144 separately from an operation of outputting the data read from the page, on which the read operation has succeeded, to the host 102.

Furthermore, whenever the operation of reading the data stored in each of the 64 MSB pages among the MSB stripe data MSB STRIPE according to the preset order succeeds, the controller 130 may perform a cumulative parity operation on the read data in order to generate or update the MSB stripe parity data MSB STRIPE PARITY DATA and store the MSB stripe parity data MSB STRIPE PARITY DATA in the buffer memory 144, the cumulative parity operation being separately perform from the operation of outputting the data of the page, on which the read operation has succeeded, to the host 102. Therefore, even after the data of the page is outputted to the host 102, the controller 130 may check the MSB stripe page bitmap information MSB STRIPE PAGE BITMAP stored in the buffer memory 144 in order to check whether a failure page is present among the 64 MSB pages of the MSB stripe data MSB STRIPE. When the failure page is present among the 64 MSB pages of the MSB stripe data MSB STRIPE, the controller 130 may recover the data of the failure page by referring to the MSB stripe parity data MSB STRIPE PARITY DATA stored in the buffer memory 144.

In accordance with the embodiments of the present disclosure, when reading data of a plurality of pages in the stripe form obtained by grouping data pages and parity pages, the memory system may generate parity data by cumulatively performing a parity operation on the data of the plurality of pages in the stripe form whenever the read operation performed on each of the plurality of pages in the stripe form on the page basis succeeds. Then, when the read operation performed on the page basis fails, the memory system may perform a recovery operation on data of the failed page by referring to the parity data. Through this operation, the memory system can perform the recovery operation without re-reading data of pages, on which the read operations have already succeeded, among the plurality of pages in the strip form, at a point of time that the read operation fails.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a plurality of memory devices;
a buffer memory; and
a controller configured to access stripe data stored in the plurality of memory devices, the stripe data being obtained by grouping data stored in a plurality of pages included in the plurality of memory devices,
wherein the controller is configured to:
access the stripe data by reading data stored in each of the plurality of pages on a page basis according to a preset order;
generate bitmap information for the plurality of pages to distinguish a first page on which a read operation has succeeded from a second page on which the read operation has failed, and store the bitmap information in the buffer memory, whenever completing the read operation for each of the plurality of pages;
generate parity data by cumulatively performing a parity operation on data of the first page among the plurality of pages whenever performing the read operation on each of the plurality of pages, and store the parity data in the buffer memory; and
check the bitmap information after the read operations on the plurality of pages are completed, and recover data of the second page by referring to the parity data when the second page is present among the plurality of pages.

2. The memory system of claim 1, wherein the controller comprises an error correction code (ECC) unit and is configured to:
read data from a read page corresponding to each of the plurality of pages according to the preset order, check whether an error occurs in the data read from the read page using the ECC unit, and perform an error correction decoding operation on the data read from the read page when the error occurs;
determine that the read operation performed on the read page has succeeded when no error occurs or the error correction decoding operation has succeeded, and sort the read page as the first page; and
determine that the read operation performed on the read page has failed when the error correction decoding operation has failed, and sort the read page as the second page.

3. The memory system of claim 2, wherein the controller sets a bit of the bitmap information that corresponds to the first page to a first value, and sets a bit of the bitmap information corresponding to the second page to a second value that is different from the first value.

4. The memory system of claim 1, wherein each of the plurality of memory devices comprises a plurality of memory blocks each including a plurality of wordlines, each of the plurality of wordlines being coupled to a plurality of memory cells in a corresponding memory block, each memory cell storing N bits of data, and
wherein the controller generates the stripe data by selecting one or more of the plurality of memory devices, selecting one or more memory blocks included in each of the one or more selected memory devices, selecting one or more wordlines included in each of the one or more selected memory blocks, selecting one of N pages coupled to each of the one or more selected wordlines, the N pages respectively corresponding to the N bits of data, and sorting, as the plurality of pages, the selected pages according to the preset order, where N is a natural number equal to or more than 1.

5. The memory system of claim 1, wherein the controller generates the parity data by performing an XOR operation as the parity operation.

6. The memory system of claim 1, wherein the plurality of pages include at least one parity page and a multiplicity of data pages.

7. The memory system of claim 1, wherein when a result of checking the bitmap information after the read operations on the plurality of pages are completed indicates that the second page is present among the plurality of pages and the controller succeeds in recovering the data of the second page by referring to the parity data, the controller outputs the data of the first page and the recovered data of the second page as read data to a host.

8. The memory system of claim 1, wherein when a result of checking the bitmap information after the read operations on the plurality of pages are completed indicates that the second page is present among the plurality of pages and the controller fails to recover the data of the second page, the controller outputs the data of the first page as read data to a host.

9. The memory system of claim 1, wherein when a result of checking the bitmap information after the read operations on the plurality of pages are completed indicates that no second page is present among the plurality of pages, the controller outputs the data of the first page as read data to a host.

10. A method of operating a memory system which includes a plurality of memory devices and a buffer memory, the method comprising:
accessing stripe data by reading data stored in a plurality of pages on a page basis according to a preset order, the stripe data being obtained by grouping the data stored in the plurality of pages included in the plurality of memory devices;
generating bitmap information for the plurality of pages to distinguish a first page on which a read operation has succeeded from a second page on which the read operation has failed, and storing the bitmap information in the buffer memory, when the read operation for each of the plurality of pages is completed;
generating parity data by cumulatively performing a parity operation on data of the first page among the plurality of pages whenever performing the read operation on each of the plurality of pages, and storing the parity data in the buffer memory; and
checking the bitmap information after the read operations on the plurality of pages are completed, and recovering data of the second page by referring to the parity data when the second page is present among the plurality of pages.

11. The method of claim 10, wherein reading the data stored in the plurality of pages comprises:
reading data from a read page corresponding to each of the plurality of pages according to the preset order, checking whether an error occurs in the data read from the read page, and performing an error correction decoding operation on the data read from the read page when the error occurs;

determining that the read operation performed on the read page has succeeded when no error occurs or the error correction decoding operation has succeeded, and sorting the read page as the first page; and determining that the read operation performed on the read page has failed when the error correction operation has failed, and sorting the read page as the second page.

12. The operating method of claim 11, wherein generating the bitmap generation comprises setting a bit of the bitmap information that corresponds to the first page to a first value, and setting a bit of the bitmap information that corresponds to the second page to a second value that is different from the first value.

13. The operating method of claim 10, wherein each of the memory devices comprises a plurality of memory blocks each including a plurality of wordlines, each of the plurality of wordlines being coupled to a plurality of memory cells in a corresponding memory block, each memory cell storing N bits of data, and wherein the method comprises generating the strip data by selecting one or more of the plurality of memory devices, selecting one or more memory blocks included in each of the one or more selected memory devices, selecting one or more wordlines included in each of the one or more selected memory blocks, selecting one of N pages coupled to each of the one or more selected wordlines, the N pages respectively corresponding to the N bits of data, and sorting, as the plurality of pages, the selected pages according to the preset order, where N is a natural number equal to or more than 1.

14. The method of claim 10, wherein the parity data is generated by performing an XOR operation as the parity operation.

15. The method of claim 10, wherein the plurality of pages includes at least one parity page and a multiplicity of data pages.

16. The method of claim 10, wherein when the second page is present among the plurality of pages and the recovering of the data of the second page succeeds, the data of the first page and the recovered data of the second page are output as read data to a host.

17. The method of claim 10, wherein when the second page is present among the plurality of pages and the recovering of the data of the second page fails, the data of the first page is output as read data to a host.

18. The method of claim 10, wherein when the second page is not present among the plurality of pages, the data of the first page is output as read data to a host.

* * * * *